(12) United States Patent
Cedilnik et al.

(10) Patent No.: US 10,209,100 B2
(45) Date of Patent: Feb. 19, 2019

(54) FIBER MEASUREMENT WITH PULSE SHAPING

(71) Applicant: AiQ Dienstleistungen UG (haftungsbeschränkt), Böblingen (DE)

(72) Inventors: Gregor Cedilnik, Gäufelden (DE); Thomas Lauber, Böblingen (DE); Alf Clement, Gärtringen (DE); Markus van Riesen, Leonberg (DE)

(73) Assignee: AiQ Dienstleistungen UG (haftungsbeschränkt), Böblingen (DE)

( * ) Notice: Subject to any disclaimer, the term of this patent is extended or adjusted under 35 U.S.C. 154(b) by 172 days.

(21) Appl. No.: 15/238,658

(22) Filed: Aug. 16, 2016

(65) Prior Publication Data
US 2017/0052041 A1 Feb. 23, 2017

(30) Foreign Application Priority Data
Aug. 17, 2015 (DE) .......................... 10 2015 113 581

(51) Int. Cl.
*G01D 5/26* (2006.01)
*G01M 11/00* (2006.01)
(Continued)

(52) U.S. Cl.
CPC ......... *G01D 5/268* (2013.01); *G01D 5/35358* (2013.01); *G01K 11/32* (2013.01);
(Continued)

(58) Field of Classification Search
CPC ...... G01D 5/26; G01D 5/268; G01D 5/35358; G01L 1/247; G01L 1/242; G01M 11/3145;
(Continued)

(56) References Cited

U.S. PATENT DOCUMENTS 5,069,544 A 12/1991 Buerli
6,259,993 B1 7/2001 Hori
(Continued)

FOREIGN PATENT DOCUMENTS

DE 10 2104 200 954 A1 7/2015
EP 0 368 001 A2 5/1990
(Continued)

OTHER PUBLICATIONS

Ohno et al., Adaptive Pulse Shaping of Phase and Amplitude of an Amplified Femtosecond Pulse Laser by Direct Reference to Frequency-Resolved Optical Gating Traces, J. Optical Society of America, Nov. 2002, vol. 19, No. 11, XP-002572770, pp. 2781-2790.
EESR, Application No. 16184410.5-1555, European Patent Office, dated Feb. 10, 2017, pp 1-8.

*Primary Examiner* — Seung C Sohn
(74) *Attorney, Agent, or Firm* — Robert A. Blaha; Smith Tempel Blaha LLC (57) ABSTRACT

A fiber measurement device for measuring a physical quantity by a fiber and a method for shaping a pulse of electromagnetic radiation are disclosed. The fiber measurement device comprises an electromagnetic radiation source and an adjustment unit. The electromagnetic radiation source generates at least one pulse of electromagnetic radiation as primary electromagnetic radiation to be coupled into the fiber, and an adjustment unit. The adjustment unit, prior to, during or after application of the primary electromagnetic radiation to the fiber, adjusts a shape of the at least one pulse for at least partially compensating a deviation between a target shape and an actual shape of the at least one pulse.

19 Claims, 3 Drawing Sheets

(51) Int. Cl.
  *G01K 11/32* (2006.01)
  *G01L 1/24* (2006.01)
  *G01D 5/353* (2006.01)

(52) U.S. Cl.
  CPC .............. *G01L 1/242* (2013.01); *G01L 1/247* (2013.01); *G01M 11/3109* (2013.01); *G01M 11/3118* (2013.01); *G01M 11/3145* (2013.01)

(58) Field of Classification Search
  CPC .......... G01M 11/3118; G01M 11/3109; G01K 11/32
  USPC ..................................................... 250/227.14
  See application file for complete search history.

(56) References Cited

U.S. PATENT DOCUMENTS 7,350,972 B2* 4/2008 Seebacher .............. G01K 11/32
  356/337
2012/0147911 A1* 6/2012 Dantus .................... G01J 11/00
  372/25

FOREIGN PATENT DOCUMENTS

EP        2 775 278 A2    9/2014
WO   WO 2004/073172 A2   8/2004

\* cited by examiner

FIBER MEASUREMENT WITH PULSE SHAPING

CROSS-REFERENCE TO RELATED APPLICATIONS

This application claims the benefit of the filing date of German Patent Application No. 10 2015 113 581.7 filed 17 Aug. 2015, the disclosure of which is hereby incorporated herein by reference in its entirety.

TECHNICAL FIELD

The invention relates to a fiber measurement device, to a fiber measurement method, to a program element, and to a computer-readable medium.

TECHNICAL BACKGROUND

Distributed Temperature Sensing (DTS) devices are optoelectronic devices which measure temperature by optical fibers functioning as linear sensors. Temperature values are recorded along the optical sensor cable as a continuous profile. A high accuracy of temperature determination is achieved over long distances. Measurement distances of several kilometers can be achieved. The temperature dependence of the Raman effect can be used for a DTS measurement.

In DTS and other distributed fiber sensing technologies, a fiber under test can be probed by sending single pulses or sequences of pulses or pulse trains of light into the fiber. Backscattered light can be analyzed and spatially resolved for different physical properties of the fiber. For instance, Raman-backscatter gives information on temperature, Brillouin-scattered light contains information on temperature and strain and Rayleigh scattered light can be analyzed for losses and reflective sections of the fiber (e.g., using optical time domain reflectometry (OTDR)) or can be used for distributed acoustic sensing (e.g., using coherent optical time domain reflectometry (C-OTDR)). To achieve sufficient spatial resolution, the outgoing pulse has to generate backscatter at a limited spatial region for a distinct time, this requires production of short pulses. If the returning signal is resolved temporally, it is possible to obtain a distributed measurement signal over time.

An approach that increases signal-to-noise ratio without increasing peak light power and without affecting the spatial resolution of the acquired signal is sending pulse trains which represent a code with suitable properties, as an example but not limited to Golay codes, Barker codes, or simplex codes.

Artifacts in pulse generation may result in artifacts in measurement data.

EP 2,775,278 discloses an optical fiber temperature distribution measurement device for measuring a temperature distribution along a longitudinal direction of an optical fiber. The device includes a light transmitter configured to input a train of code-modulated light pulses into the optical fiber, a light receiver configured to receive Raman back scattering light generated by inputting the train of code-modulated light pulses into the optical fiber, a demodulator configured to perform a correlation processing between a measured signal output from the light receiver and a code string associated with a type of the code modulation performed by the light transmitter, and to demodulate the measured signal. A data store is provided for storing correction data to be used to correct a distortion of the measured signal output from the light receiver when an impulsive pulsed light is output from the light transmitter. A corrector is configured to perform a correction to one of the measured signal output from the light receiver and a demodulated signal output from the demodulator, using the correction data stored in the data store.

SUMMARY

Considering the prior art discussed above, there may be a need to enable fiber measurement with high accuracy.

According to exemplary embodiments of the invention, there are provided a fiber measurement device, a fiber measurement method, a program element, and a computer-readable medium according to the independent claims.

In a first embodiment, a fiber measurement device for measuring a physical quantity by a fiber, includes an electromagnetic radiation source configured for generating at least one pulse of electromagnetic radiation as primary electromagnetic radiation to be coupled into the fiber and an adjustment unit configured for, prior to, during or after the generating, adjusting a shape of the at least one pulse for at least partially compensating a deviation between a predefined target shape and an actual shape of the at least one pulse.

In a second embodiment, a method of measuring a physical quantity by a fiber, includes the steps of controlling an electromagnetic radiation source for generating at least one pulse of electromagnetic radiation as primary electromagnetic radiation to be coupled into the fiber and prior to, during or after the generating, adjusting a shape of the at least one pulse for at least partially compensating a deviation between a predefined target shape and an actual shape of the at least one pulse.

In another embodiment, a non-transitory computer-readable medium, includes a computer program stored thereon, which computer program, when being executed by a processor, is adapted to control an electromagnetic radiation source for generating at least one pulse of electromagnetic radiation as primary electromagnetic radiation to be coupled into a fiber and prior to, during or after the generating, adjust a shape of the at least one pulse of electromagnetic radiation for at least partially compensating a deviation between a predefined target shape and an actual shape of the at least one pulse of electromagnetic radiation.

BRIEF DESCRIPTION OF THE DRAWINGS

The illustrations in the drawings are represented schematically. In different drawings, similar or identical elements are provided with the same reference signs.

In the following, exemplary embodiments of the present invention are described in detail with reference to the following figures.

EXEMPLARY EMBODIMENTS

Data processing which may be performed according to embodiments of the invention can be realized by a computer program, that is by software, or by using one or more special electronic optimization circuits, that is in hardware, or in hybrid form, that is by means of software components and hardware components. For instance, it is also possible to implement the architecture according to an exemplary embodiment of the invention in an electronic circuit, such as an analog circuit or a digital circuit.

The term "fiber" may particularly denote a member (in particular an optoelectronic member) capable of guiding electromagnetic radiation to propagate along a defined path through the fiber. A fiber made for instance of fused silica glass may be capable for transporting visible and infrared radiation. Hence, a fiber may be denoted as a dielectric waveguide at least partially transparent for electromagnetic radiation.

The term "electromagnetic radiation" may particularly denote photons of a suitable wavelength capable of propagating through a fiber. Optical radiation may be in a range between 400 nm and 800 nm, i.e. may be in the visible region. Infrared radiation usable for partial discharge detection may be in a range between 800 nm and 5000 nm. For instance, 1550 nm is a suitable measurement wavelength.

In the context of the present application, the term "fiber measurement" may particularly denote a measurement in which primary electromagnetic radiation is coupled into a fiber which results in an interaction between the primary electromagnetic radiation and the fiber material. This interaction is dependent on physical quantities at a respective position of the fiber, in particular local temperature, the presence of local vibrations, etc. The primary electromagnetic radiation will be scattered, in particular partially elastically and partially inelastically. A secondary electromagnetic radiation beam is therefore backscattered and propagates through the fiber to be detected by an electromagnetic radiation detector. Thus, the electromagnetic radiation in combination with the fiber is used as a probe for the measurement of the physical quantity, such as a temperature or a temperature distribution along the fiber, a vibration or a vibration distribution along the fiber, etc.

In the context of the present application, the term "pulse" may particularly denote a temporally and spatially limited section of electromagnetic radiation. For instance, such a pulse may have a rectangular shape. In terms of fiber measurements, the pulses may be pulses with GHz bandwidth. For instance, a length of a pulse may be in a range between 100 ps and 100 ns, for example 5 ns. For instance, a length of a pulse train may be in a range between 500 ns and 100 µs, for example 5 µs. In the context of the present application, the term "pulse train" may denote multiple pulses representing a code pattern.

In the context of the present application, the term "predefined target shape" may particularly denote a desired or ideally required or defined shape or envelope of the pulse to be emitted by the electromagnetic radiation source. Such a theoretically desired target shape of a pulse may be rectangular with a vertical rising edge, a horizontal pulse duration section and a vertical falling edge. However, other target shapes are possible as well.

In the context of the present application, the term "actual shape" may particularly denote the shape of a pulse as actually emitted by the electromagnetic radiation source. Due to imperfections and distortions, such as delays at the beginning and/or at the end of the pulse, intensity fluctuations, fluctuations in a drive signal driving the electromagnetic radiation source, pumping effects of a laser as electromagnetic radiation source, thermal effects, optical artifacts, noise, etc., the actual pulse shape may differ from the target pulse shape.

Deviations between target shape and actual shape may refer to a change of the envelope of the pulse (including overshooting and/or undershooting phenomena), a change of the intensity of the entire pulse or (even worse) only part thereof, a positive or negative temporal delay of an actual pulse compared to a target pulse, a change in the pulse length, a change of a slope in a rising edge and/or a falling edge of a pulse, a deviation from a rectangular shape of a pulse, etc.

Exemplary embodiments are based on the consideration that accuracy of a fiber measurement can be significantly improved by correcting a shape of at least one pulse of the probe beam to be coupled into the fiber. Therefore, pulse shape imperfections may be partially or fully corrected so that the precision of the measurement of a physical quantity may be improved. According to an exemplary embodiment, measures for correcting artifacts resulting from imperfect pulses may be taken (only or also) on the transmitter/emitter side, not (or not only) on a receiver/detector side. Pulse shape correction may be performed on the level of individual pulses or in an average over multiple pulses or in sequences of multiple pulses or measurements.

In the following, further exemplary embodiments of the device, the method, the program element, and the computer-readable medium will be explained.

In an embodiment, the device may comprise a determining unit (such as a processor or a part thereof) configured for (in particular prior to, during or after the generating) determining the deviation between the target shape and the actual shape of the at least one pulse. Thus, the system may actively analyze the shape of the generated pulse (i.e. already emitted by the electromagnetic radiation source) or may anticipate or predict an expected shape of the pulse to be generated (i.e. before its emission by the electromagnetic radiation source) and may thereby monitor or predict the characteristics of pulse distortions.

More precisely, pulse shape analysis prior to emission of the pulse may be denoted as pulse shape prediction and may be accomplished, for instance, by monitoring and analyzing the shape of a drive signal driving an electromagnetic radiation source for emitting a pulse. In case such a drive signal already comprises distortions, it can be concluded that probably also the electromagnetic radiation pulse may comprise corresponding distortions. By anticipating future distortions of pulses to be generated as a consequence of distorted drive signals, it may become possible to correct the drive signals, thereby indirectly correcting also future pulses.

For instance, it may be possible to determine, for an electromagnetic radiation source and/or a modulator, a characteristic behavior according to which the electromagnetic radiation source and/or the modulator generates an output signal (such as an emitted electromagnetic radiation pulse)

on the basis of a corresponding input signal (such as an electric drive signal). The result of this determined or analyzed characteristic behavior of the electromagnetic radiation source and/or the modulator may then be used for modifying, correcting or adapting the input signal so that the modified, corrected or adapted input signal results in an output signal being free of distortions.

Hence, the device may react promptly and dynamically to time-dependent changes in the deviation characteristic. Such a dynamic correction may have the advantage that it allows a correction to be carried out with high accuracy.

Alternatively, an expected (for instance theoretically expected or empirically expected) deviation may be used as a basis for the adjustment. In such a case, a determining unit may be omitted, which is advantageous. Such a static correction may have the advantageous side effect that it may allow a correction substantially in real time with low computational burden.

In an embodiment, the adjustment unit may be configured for adjusting the shape before coupling the at least one pulse into the fiber. In other words, the adjustment unit may be configured for adjusting the shape of the at least one pulse upstream (in a propagation direction of the primary electromagnetic radiation) of the fiber. Therefore, the correction can be performed before the primary electromagnetic radiation enters the fiber and the actual fiber measurement starts, i.e. before the primary electromagnetic radiation is coupled into the fiber. Thus, the pulse shape correction may be already completed before the pulses enter the measurement fiber acting as a probe for measuring the physical quantity. This may ensure an improved accuracy over the entire measurement path.

In an embodiment, the device may comprise an electromagnetic radiation detector configured for detecting secondary electromagnetic radiation generated in the fiber in response to the coupling of the primary electromagnetic radiation into the fiber. For example, the electromagnetic radiation detector may be a photodiode or any other photodetector which may be capable of detecting the secondary electromagnetic radiation being generated as a response to the primary electromagnetic radiation coupled into the fiber. The electromagnetic radiation source may for instance be a light source emitting visible light, infrared light, ultraviolet light, etc.

In an embodiment, the adjustment unit may be configured for controlling the electromagnetic radiation source for generating the at least one pulse with the adjusted shape. By adjusting the shape of drive signals based on which subsequent electromagnetic radiation pulses will be generated, a pulse may be already emitted with the corrected shape. In other words, the correction according to this embodiment may be applied already on the level of electric drive signals driving the electromagnetic radiation source for emitting electromagnetic radiation pulses, rather than correcting the already generated electromagnetic radiation pulses. A corresponding fiber measurement device may contain a light source to emit single pulses or sequences of pulses or pulse trains. Deviations of the outgoing pulses or pulse trains from the target shape may be determined, and the light source output may be adjusted for subsequent light emission to correct the pulse deviations for future pulses accordingly. Additionally or alternatively, an optical amplifier may be provided to amplify those pulses, actual-target-deviations of the outgoing pulses or pulse trains may be determined, and the light source output may be adjusted to correct for pulse deviations as determined. According to the described embodiments, the deviation between actual pulse and target pulse can be compensated for a future pulse before the future pulse's actual generation. If the characteristic of the electromagnetic radiation source is such that the deviation is caused due to an intrinsic behavior of the electromagnetic radiation source, it may be possible to anticipate corresponding discrepancies and to adjust operation of the electromagnetic radiation source in order to partially or fully compensate the deviation.

In an embodiment, the adjustment unit may be configured for adjusting a drive signal, in particular a drive current or a drive voltage, of the electromagnetic radiation source for generating the at least one pulse with the adjusted shape. Hence, the correction may be done by directly varying the drive current or drive voltage of the light source. For instance, when the electromagnetic radiation source is a laser, the drive current applied to such a laser may be applied with a modified profile being inverse to the shape of the distortion being responsible for the deviation between the target shape and the actual shape. By simply adapting the profile or shape of the drive signal, a precise compensation of the distortions or artifacts may be possible with low effort.

In an embodiment, the adjustment unit nay be configured for adjusting a shape of the at least one pulse after its generation by the electromagnetic radiation source. Additionally or alternatively to the specific selection of a drive signal of the electromagnetic radiation source preventing an undesired erroneous shaping of an emitted pulse, it may be possible to adjust the pulse shape after its generation and during its propagation towards the beam inlet of the measurement fiber. In particular, any remaining inaccuracies after the generation of the respective pulse can be compensated by optical manipulation upstream of the fiber.

In an embodiment, the adjustment unit may comprise an electromagnetic radiation manipulator (such as an electro-optical manipulator, EOM, or an acousto-optical manipulator, AOM) configured for adjusting the shape of the already emitted at least one pulse by manipulating the generated primary electromagnetic radiation. Such an electromagnetic radiation manipulator may be either a passive electromagnetic radiation manipulator or an active electromagnetic radiation manipulator. A passive electromagnetic radiation manipulator may be configured so as to change the pulse shape of the pulse in a predefined static way, for instance for compensating previously identified or otherwise known constant distortions. Alternatively, an adjustable electromagnetic radiation manipulator may be provided which may be capable of applying a definable envelope onto an actual pulse so as to reshape it to assume the target shape or a shape closer to the target shape than the actual shape.

In an embodiment, the electromagnetic radiation manipulator may be configured for at least one of attenuating and/or amplifying the at least one pulse for adjusting its shape. In particular, attenuation and/or amplification of the at least one pulse may be carried out depending on an intensity profile of the at least one pulse. For instance, an uneven intensity profile along a pulse may be flattened or smoothed by selectively attenuating relatively intense sections of a pulse while selectively amplifying relatively weak sections of the pulse. In other words, a variable gain factor (which may be larger than one or smaller than one) may be applied to individual portions of the actual pulse. Thus, the correction may be done by using a manipulator capable of attenuating, amplifying or both to adjust the signal shape. In an embodiment, the correction may be done by using an existing optical amplifier to adjust the signal shape.

In an embodiment, the determining unit may be configured for determining the deviation by an electromagnetic radiation sensor configured for sensing information indicative of the actual shape. In such an embodiment, the deviation of the outgoing signal may be monitored with a separate optical detector. In such an embodiment, a dedicated electromagnetic radiation sensor may monitor the shape of the respective pulses. In case the electromagnetic radiation sensor, which may be a photodiode, detects a deviation of the pulse shape from the target shape, it may supply this information to a feedback loop so as to control the electromagnetic radiation source to produce subsequent pulses in a corrected manner. Additionally or alternatively, the electromagnetic radiation sensor may also send the information indicative of the deviation to an electromagnetic radiation manipulator downstream of the analysis position of the actual pulse but upstream of the measurement fiber, so that the compensation or correction of the actual pulse can be performed by this electromagnetic radiation manipulator based on the detection result of the electromagnetic radiation sensor.

In an embodiment, the device may comprise a beam splitter configured for splitting the primary electromagnetic radiation into a first portion to be coupled into the fiber and into a second portion, in particular smaller (for instance at least hundred times smaller) than the first portion, to be coupled to the electromagnetic radiation sensor. Such a beam splitter or tap may couple out a small amount of the intensity of the primary electromagnetic radiation which may then be used as a probe detected by the electromagnetic radiation sensor for analyzing the shape of the pulse. In contrast to this, the large majority of the intensity of the primary electromagnetic radiation (for instance at least 99% or 99.9% of the entire intensity) may be coupled into the measurement fiber. This may have the advantage that the actual fiber measurement remains substantially undisturbed, while the tap or beam splitter makes it possible to dynamically and continuously monitor the pulse shape so as to be able to correct the pulse shape online or during the measurement, if required or desired.

In an embodiment, the determining unit may be configured for determining the deviation by analyzing actually detected secondary electromagnetic radiation concerning a predefined reference measurement feature obtained with the at least one pulse having the actual shape rather than the target shape. Thus, a well-known detectable reference event (such as a defined temperature event at the fiber or a predefined position thereof) may be analyzed, and the response of the measured secondary electromagnetic radiation to this reference event may be detected. The actually measured detection data may then be indicative of a convolution of the actual pulse shape and the predefined reference measurement feature. A deconvolution of the actually measured detection data, using the known information about the predefined reference measurement feature, may then allow to derive information concerning the actual pulse shape. Hence, the shape deviation of the actual signal may be determined by the system response to a measured feature with known properties. After this detection, one of the above-mentioned measures (such an adjustment of the control of the drive of the electromagnetic radiation source, or a corresponding adjustment of an electromagnetic radiation manipulator) may be taken until the deviation in the measurement data falls below a threshold value, or becomes zero. This can be done by a calibration on the user side or by self-calibration.

In particular, the determining unit may be configured for determining the deviation by comparing on the one hand actually detected secondary electromagnetic radiation concerning a predefined reference measurement feature obtained with the at least one pulse having the actual shape, and on the other hand target secondary electromagnetic radiation expected concerning the predefined reference measurement feature for the at least one pulse having the target shape. Thus, the pulse shape distortion may also be derived from a comparison of clean or undisturbed measurement data measured for the predefined reference measurement feature (for instance a standard temperature event) with ideal or undistorted pulse shape (which measurement data may be obtained during a calibration procedure, for instance carried out at a factory side) with actual measurement data as a fingerprint of the distorted pulse shape. In such an embodiment, a known feature, for instance a known temperature event at a known position at the fiber, can be measured for the actual pulse shape and may be compared to a reference measurement relating to an ideal target shape (for instance a rectangular pulse) for this reference temperature event. The deviation of the expected detection signal from the actually detected detection signal may then allow to derive information about a potential erroneous pulse shape.

In an embodiment, the determining unit may be configured for determining the deviation based on a predefined model concerning imperfection of the shape of the at least one pulse before being coupled into the fiber. Such a (for instance theoretical or empirical) model may describe as to how effects within the electromagnetic radiation source and/or along an optical path from the electromagnetic radiation source to the inlet of the fiber influence the pulse shape. Thus, the deviation of the outgoing pulse shape may be estimated from modeling. In this embodiment, the determination of the deviation may be performed without carrying out any additional measurement, merely on the basis of expert knowledge or empirical data concerning the deviation of an actual pulse shape from a target shape. Pulse generation in the electromagnetic radiation source and/or pulse manipulation along a propagation path between electromagnetic radiation source and fiber may then be adapted correspondingly to compensate the previously identified or otherwise known imperfections of the pulse shape. This may be a very simple measure of performing the correction which may not require any additional hardware/optics.

The mentioned imperfections (compare also FIG. 3 and FIG. 4 in comparison to FIG. 2), which may be modeled for pulse shape correction, may include one or more of:
effects in the electromagnetic radiation source causing drive signal amplitude distortions,
effects in the electromagnetic radiation source causing propagation delay,
thermal fluctuations in the electromagnetic radiation source,
modulation effects in terms of the generation of the at least one pulse by the electromagnetic radiation source involving a modulator, and/or
effects in terms of an amplification of the at least one pulse downstream of the electromagnetic radiation source, etc.

In an embodiment, the adjustment unit may be configured for adjusting the shape by averaging (in particular temporal weighting of the backscatter of) multiple pulses of a pulse train. In this context, the term "pulse train" may particularly denote a sequence of consecutive pulses introduced or coupled into the fiber. For instance, such a pulse train may comprise 256 pulses or 512 pulses (other quantities of pulses are of course possible and are contemplated). Averaging over multiple pulses may also average individual distortions of the actual shape which provides an improvement in the accuracy.

More specifically, the adjustment unit may be configured for adjusting the shape by manipulating, in particular varying or switching off, at least a part of the averaged multiple pulses. The backscatter of multiple shots of a pulse train may be averaged and the correction may be done by keeping single or individual pulses varied or switched off in a fraction of the averaged shots. For instance, by temporarily switching off the electromagnetic radiation source, erroneously shaped pulses may be eliminated. In particular, pulses of a pulse train that have an energy exceeding a predefined threshold value can be reduced by turning off the electromagnetic radiation source for one or more respective pulses for a certain number of shots so that an average over the shots meets a predefined energy criterion.

Additionally or alternatively, the adjustment unit may be configured for, in terms of the averaging, adjusting the shape by sending only pulses with power above a predefined power value and subtracting a backscattering signal. Therefore, multiple shots of a pulse train may be averaged and the correction may be done by sending only the pulses with original or modified power that are too strong for a number of shots and subtracting the respective backscattering signal.

In an embodiment, the adjustment unit may be configured for, in terms of the averaging, adjusting the shape by sending only pulses with power below a predefined power value. Multiple shots of a pulse train can be averaged and the correction can be done by sending only the pulses with original or modified power of a train that may be too weak for a fraction of the averaged shots.

In an embodiment, the determining unit and the adjustment unit may form a part of a control loop in which the deviation is determined and the shape is adjusted. Hence, it may be possible to use a control loop, regulation loop or feedback loop to determine and apply the correction. Thus, a forward loop may transport the pulses from the electromagnetic radiation source into the fiber, whereas a feedback loop or control loop may in parallel determine potential deviations of an actual pulse shape compared to a target pulse shape and may perform a corresponding partial or full compensation or correction. This architecture may leave the actual measurement undisturbed while ensuring a proper accuracy of the pulse shape.

In an embodiment, the determining unit and the adjustment unit may be configured for determining the deviation and adjusting the shape before or during performing a fiber measurement. In one embodiment, the control loop may work online parallel to performing a measurement. In another embodiment, the control loop may be used to self-calibrate the instrument before measurement start. In yet another embodiment, the control loop may be used for calibration, for instance during factory calibration on scheduled recalibration. Carrying out the pulse adjustment already before the start of the fiber measurement ensures that the entire fiber measurement can be performed with a correct pulse shape. Carrying out the correction during the measurement may also allow to react on dynamic changes of the pulse shape, for instance due to a change of the temperature of the electromagnetic radiation source, ageing effects, change of operation parameters, etc.

In an embodiment, the electromagnetic radiation source may be configured for generating, as the at least one pulse, one of the group consisting of a single pulse, a sequence of pulses, or a pulse train. For instance, a single pulse may have a duration of several nanoseconds. A complete pulse train may have a duration of several microseconds.

In an embodiment, the device may comprise an evaluation unit configured for evaluating the detected secondary electromagnetic radiation for determining information indicative of the physical quantity. The physical quantity may be a value of a physical parameter, for instance a temperature, a vibration or mechanical load, etc.

In an embodiment, the device may be configured as a Distributed Temperature Sensing (DTS) device, a Distributed Acoustic Sensing (DAS) device and/or an Optical Time-Domain Reflectometer (OTDR) device. With DTS it is possible to determine a temperature or a temperature distribution along the fiber. With DAS it may be possible to detect vibrations or mechanical load, and in particular a corresponding spatial distribution thereof along the extension of the fiber. An OTDR may be an optoelectronic instrument which may be used to characterize the fiber losses and reflections.

The aspects defined above and further aspects of the invention may be apparent from the examples of embodiment to be described hereinafter and may be explained with reference to these examples of embodiment.

The invention will be described in more detail hereinafter with reference to examples of embodiment but to which the invention is not limited.

Before describing the figures in further detail, some basic considerations of the present inventors will be summarized based on which exemplary embodiments have been developed.

An exemplary embodiment of the invention put emphasis on light pulse imperfections and reduces or even eliminates such pulse imperfections by pulse shaping.

Imperfections of generated pulses (see also FIG. 3 and FIG. 4 in comparison to FIG. 2) can cause distortions of the acquired and deconvoluted measurement signal in terms of fiber measurement. In the following, examples for such imperfections of pulses are given. Exemplary embodiments of the invention may suppress or even eliminate such and other imperfections:

For an architecture where the electromagnetic radiation source, in particular a laser, is directly modulated by the driving current, inductivities in housing and circuitry can cause voltage overshoots when switching the current causing overshoots in the emitted light pulses. Furthermore, inductivities can cause propagation delays from the current alteration to the emission of light so that switching of the light is delayed both for switch-on and switch-off. Both can change the energy of part of the pulse for a respective window. Beyond this, thermal fluctuations in the electromagnetic radiation source (such as a laser) or the driving circuit thereof can cause temporally varying envelopes of single pulses or pulse trains.

In the case of indirect modulation where the light is emitted continuously from the electromagnetic radiation source and modulated optically, for instance by an electro-optical element, an acousto-optical element, a MEMS (microelectromechanical system), a semiconductor attenuator, etc., the specific characteristics, for instance delays or overshoots, of the modulator can influence the shape of the pulses.

Furthermore, subsequent optical amplification of the primary electromagnetic radiation can introduce imperfections of pulses and pulse trains. Fiber amplifiers may provide a high gain but usually may have long time constants of pumping the active medium compared to the pulse or pulse train duration. Thus, during light emission the amplifier may get depleted and each pulse of a pulse train or the pulse itself for a single pulse may get less amplification than the one before. The amplifier may get re-pumped until the next pulse and will show the same decay again (see FIG. 5).

These and other phenomena of pulse shape distortion can be determined, for example by taking one or more of the following measures:

The determination of the deviation from an optimum target pulse shape can be achieved directly via a tap-coupler and a fast photo-detector.

Additionally or alternatively, it may be possible to analyze the acquired signal of distinct and known feature along the sensing portion of the fiber to extract the distortion of the sent pulses.

If the deviation of the light signal can be modeled from basic physical considerations or parameterization of an empirical model, a compensating input can be calculated to suppress or even eliminate the effect. The model can be optionally calibrated with suitable parameters during initial calibration, on self-test or during a running measurement.

In particular, it may be possible to implement a feedback loop to correct individual pulse intensities.

There may be several ways to compensate these imperfections according to exemplary embodiments of the invention. Some of which may be:

The drive current of the electromagnetic radiation source can be varied with a high speed digital-to-analog converter controlling the current source to adjust the energy and shape of each pulse as well as the envelope in feed-back loop manner or from the derived model.

Optical modulators like an electro-optic modulator (EOM), an acousto-optic modulator (AOM), or a fast amplifier like a semiconductor optical amplifier (SOA) can be used to modify the intensity to its target value. Such one or more modulators can be positioned on several places in a sequence of optical elements which generate pulses or pulse trains.

In setups where multiple shots are averaged, the average intensity of single pulses of a pulse train can be modified by temporal weighting:

For instance, pulses of a train that have too much energy can be reduced by turning off the light of the specific pulse for a certain number of shots so that the average of all shots shows the desired energy. It may also be possible that pulses of a train that have too much energy can be reduced by sending only the respective pulses and subtract the signal from the original one.

Pulses of a train that have too low energy can be sent again and added to the original signal.

DETAILED DESCRIPTION OF EXEMPLARY EMBODIMENTS

Figure 1:
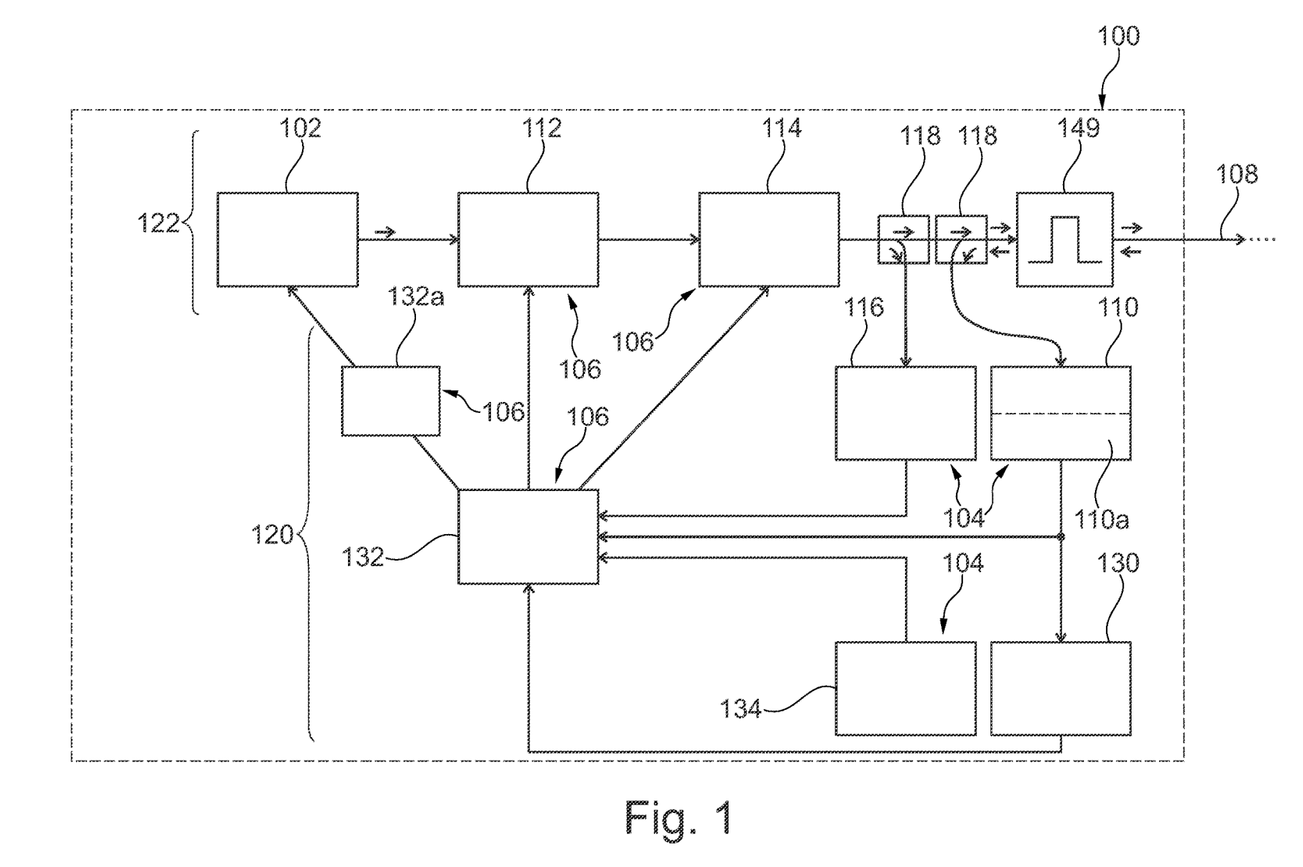
FIG. 1 illustrates fiber measurement devices according to exemplary embodiment of the invention.

FIG. 1 illustrates a fiber measurement device 100, embodied as a Distributed Temperature Sensing (DTS) system, according to an exemplary embodiment of the invention.

The fiber measurement device 100 may comprise a laser as an electromagnetic radiation source 102 configured for generating pulses of electromagnetic radiation as primary electromagnetic radiation to be coupled into a fiber 108 for a DTS measurement. The electromagnetic radiation emitted by the electromagnetic radiation source 102 may be near infrared light, for instance with a wavelength in a range between 1000 nm and 1600 nm. The length of the individual pulses may be several nanoseconds, for instance 5 ns.

For the following description, in particular two units shall be introduced: A determining unit 104 may be provided and configured for determining a potential deviation between a predefined target shape and an actual shape of the pulses generated and emitted by the electromagnetic radiation source 102. An adjustment unit 106 may be configured for adjusting the shape of the pulses for correcting or compensating the deviation between the theoretically desired target shape and the real or actual shape as emitted by the electromagnetic radiation source 102 although attempting to generate pulses of the target shape. The determining unit 104 and the adjustment unit 106, which may be embodied as individual processors or one common processor, may include several subcomponents which will be described below in further detail.

The pulses of primary electromagnetic radiation generated and emitted by the electromagnetic radiation source 102 may propagate along an optical path 122, may be optionally optically amplified by an optional amplifier 114 and may then be coupled into a measurement fiber 108. The amplifier 114 may be a fiber amplifier (such as a piece of pumped fiber for stimulating emission, for instance an erbium doped fiber amplifier, EDFA) or a solid-state laser.

The primary electromagnetic radiation may then propagate along the fiber 108, in a way as may be known by those skilled in the art of DTS, and may be backscattered so that secondary electromagnetic radiation may propagate backwardly along the fiber 108. The backscattered secondary electromagnetic radiation may include information concerning the physical entity to be sensed, such as a temperature distribution along the spatial extension of the fiber 108. An electromagnetic radiation detector 110, for instance a photodetector, may be configured for detecting the secondary electromagnetic radiation which has been generated in the fiber 108 in response to the coupling of the primary electromagnetic radiation into the fiber 108. As indicated in FIG. 1, it may be optionally possible to provide a pre-processing unit 110a (which may either form part of the electromagnetic radiation detector 110 or may be provided, in a signal flow path, downstream of the electromagnetic radiation detector 110) which may be configured for pre-processing the detection signals before forwarding the (then pre-processed) detection signals to one or more of the units indicated with reference numeral 132, 130. An evaluation unit 130 may be configured for evaluating the detected secondary electromagnetic radiation for determining information indicative of the physical quantity, i.e. for determining the temperature distribution along the fiber 108.

In a scenario in which an actual pulse shape (see for instance FIG. 3 and FIG. 4) differs or deviates from a predefined target shape (see for instance FIG. 2), artifacts may be introduced into the fiber measurement device 100 which may reduce the accuracy of the detected physical quantity. The determining unit 104 and the adjustment unit 106 may operate and functionally cooperate for improving the accuracy of the pulse shaping, thereby also improving the accuracy of the detected physical quantity. In the following, several possibilities of determining and adjusting will be described. It may be however clear for a skilled person that one of the mentioned possibilities of determining and one of the mentioned possibilities of adjusting may be sufficient for improving the accuracy. Thus, any possible combination of the various possibilities of determining and the various possibilities of adjusting may be possible, even determining with multiple of these possibilities and/or adjusting with multiple of these possibilities. In yet another embodiment, a determination unit 104 may even be omitted in a scenario in which a deviation between a target pulse shape and an actual pulse shape is already known, for instance from historic measurements.

According to one possibility of determining, the determining unit 104 may be configured for determining the deviation by a separate electromagnetic radiation sensor 116, such as a photodiode. In this context, a beam splitter 118 or tap may be provided for splitting the primary electromagnetic radiation into a large first portion to be coupled into the fiber 108 and into a much smaller second portion to be coupled to the electromagnetic radiation sensor 116. The electromagnetic radiation sensor 116 may then detect the second portion and may use the corresponding detection data for analyzing pulse shape to thereby determine the actual pulse shape. The determined actual pulse shape may then be compared to the predefined target shape to determine the deviation.

According to another possibility of determining, the determining unit 104 may be configured for determining the deviation by analyzing actually detected secondary electromagnetic radiation concerning a predefined reference measurement feature obtained with the pulses having the actual shape (i.e. without correction or compensation). For instance, a standard spatial temperature event (such as a temperature step of 100° C. at a predefined position of the fiber 108) may be applied and measured. The corresponding secondary electromagnetic radiation detected by the electromagnetic radiation detector 110 (wherein the beam splitter 118 can direct the secondary electromagnetic radiation or part thereof to the electromagnetic radiation detector 110) can then be evaluated with the knowledge that the temperature difference is 100° C. at the predefined position of the fiber 108. A discrepancy between the actually detected secondary electromagnetic radiation and secondary electromagnetic radiation expected for this standard temperature event may then be due to pulse shape artifacts which may allow to calculate the deviation of the actual pulse shape from the predefined target pulse shape.

In yet another possibility of determining, the determining unit 104 may be configured for determining the deviation based on a predefined model concerning imperfection of the shape of the pulses before being coupled into the fiber 108. A database 134 may comprise corresponding data of such a model of imperfections of the shape of the pulses.

According to one possibility of adjusting, the adjustment unit 106 may be configured for controlling, under control of a control unit 132 (such as a processor, which may be a separate processor or may form part of one of the above-mentioned processors), the electromagnetic radiation source 102 for generating the pulses already with adjusted shape. More specifically, the control unit 132 of the adjustment unit 106 may be configured for adjusting a drive current or a drive voltage of the electromagnetic radiation source 102 for generating the pulses with the adjusted shape. Thus, future pulses may already be emitted by the electromagnetic radiation source 102 with a corrected pulse shape.

According to another possibility of adjusting, the adjustment unit 106 may be configured for adjusting shape of the pulses after its generation by the electromagnetic radiation source 102. For this purpose, the adjustment unit 106 may comprise an electromagnetic radiation manipulator 112 (such as an AOM or an EOM) configured for adjusting the shape of the pulses by manipulating the generated primary electromagnetic radiation prior to being coupled into the fiber 108. Optionally, already present amplifier 114 may be synergistically used for this purpose. In FIG. 1, the positions of the electromagnetic radiation manipulator 112 and of the amplifier 114 may be also exchanged. The electromagnetic radiation manipulator 112 may be configured for attenuating and/or amplifying an intensity profile of the pulses for adjusting their shape. The respective pulses may be shaped in the electromagnetic radiation manipulator 112 and may continue to propagate on their path towards optional optical amplifier 114.

According to yet another possibility of adjusting, the adjustment unit 106 may be configured for adjusting the shape by averaging the acquired backscatter signal over multiple emissions of a pulse train. This may be done by manipulating, in particular varying or switching off, a part of the averaged multiple pulses. This may also be done by sending only pulses with power above a predefined power value and subtracting a backscattering signal of the secondary electromagnetic radiation. Furthermore, this can be done by sending only pulses with power below a predefined power value.

As can be taken from FIG. 1, the determining unit 104 and the adjustment unit 106 may form a part of a control loop 120 in which the deviation may be determined and the shape may be adjusted. The control loop 120 can be provided in parallel to the measurement or optical path 122 so that the measurement can be continued during the pulse shape correction.

Reference numerals 116 and/or 110 and/or 134 may therefore form determining unit 104 determining a deviation between a predefined target shape and actual shape of the pulse. Control unit 132 controlling the pulse generation of the fiber measurement device 100 may be supplied with the data from the determining unit 104 indicative of the deviation between the target shape and the actual shape. In one alternative, the pulse generation and correction may run independently from the overall measurement evaluation. On the basis of this discrepancy, the control unit 132 may control the electromagnetic radiation source 102 and/or the electromagnetic radiation manipulator 112 and/or the optional amplifier 114 so as to partially or fully compensate the deviation. As indicated in FIG. 1, it may be optionally possible to provide an electromagnetic radiation source control unit 132*a* configured for controlling electromagnetic radiation emission of the electromagnetic radiation source 102 based on control signals received from the control unit 132. Thus, after the pulse shaping performed by the adjustment unit 106 (formed by reference numerals 132 and/or 112 and/or 114), the actual shape may correspond to the target shape. Advantageously, the pulse shape correction may be performed prior to the detection of the secondary electromagnetic radiation by the electromagnetic radiation detector 110, in particular before coupling the primary electromagnetic radiation into the fiber 108.

It should furthermore be mentioned that, as an alternative to the beam splitter 118, in particular what concerns the outcoupling of the secondary electromagnetic radiation beam, it may be possible to implement a wavelength splitter (such as a WDM element, wavelength division multiplexer) or a circulator.

As indicated schematically with reference numeral 149 in FIG. 1, it may be possible that a pre-known (e.g., a previously identified or otherwise known) reference spatial event at the measurement fiber 108 alternatively inside the instrument along the measured path (such as a high temperatures spot at a certain position along the measurement fiber 108) is present. It may furthermore be possible that determining and adjusting are accomplished in the presence of such a pre-known reference spatial event.

According to FIG. 1, control of the drive voltage for driving the electromagnetic radiation source 102 may be integrated in the control unit 132. However, alternatively, the drive voltage or any other drive signal may be generated and/or controlled also by another entity than the control unit 132.

As can be taken from FIG. 1, the determination of the deviation may be carried out by the determining unit 104 based on the generated initial pulse (see reference numeral 116) and/or based on the detected response pulse (see reference numeral 110) and/or based on model data (see reference numeral 134). However, it should be emphasized that, additionally or alternatively, the determination of the deviation may be carried out by the determining unit 104 also on the basis of an intermediate or final result of the physical quantity to be determined (such as on the basis of a temperature signal or a pre-form thereof). For instance in case of DTS, the Stokes signal and the Antistokes signal may be extracted from the detection signals detected by the electromagnetic radiation detector 110. The temperature distribution along the measurement fiber 108 may then be determined based on a ratio between Stokes signal and Antistokes signal. Hence, certain calculations may be carried out in order to obtain the physical quantity based on the detection signal. During these certain calculations, intermediate results and a final result may be obtained. Any of these intermediate (see reference numeral 110a) or final (see reference numeral 130) results may be used as a basis for the determination of the distortion.

Figure 2:
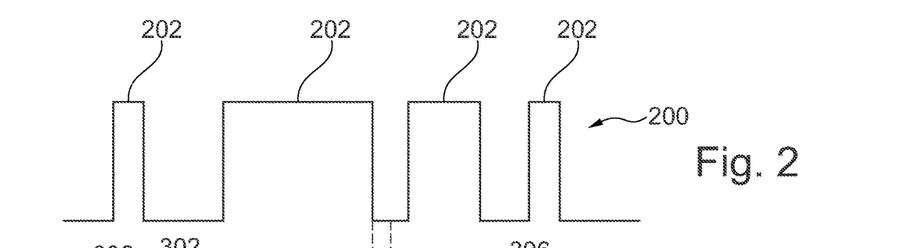
FIG. 2 illustrates an ideal target shape of a sequence of pulses.

FIG. 2 illustrates an ideal target shape 200 of a sequence of pulses 202. The target shape 200 in this scenario is a rectangular shape, wherein different pulses 202 of the shown pulse train have different lengths in time or space.

Figure 3:
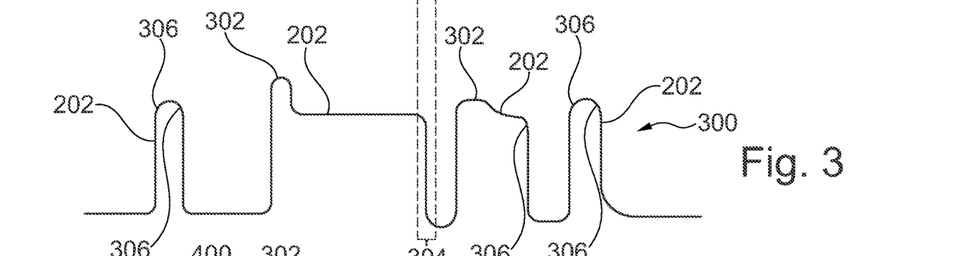
FIG. 3 and FIG. 4 illustrate for the sequence of pulses according to FIG. 2 an actual pulse shape as occurring during a real measurement showing different pulse shape deviations or imperfections which may be considered for at least partially compensating them according to exemplary embodiments of the invention.
Figure 4:
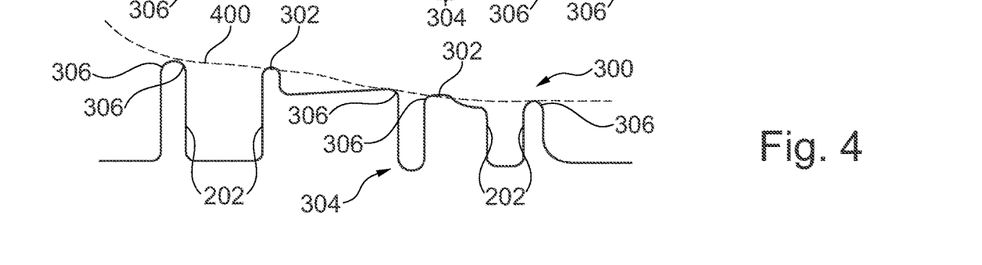

FIG. 3 and FIG. 4 illustrate for the sequence of pulses 202 according to FIG. 2 actual pulse shapes 300 as occurring during a real measurement. Thus, FIG. 3 and FIG. 4 show different pulse shape deviations or imperfections which may be considered for at least partially compensating them according to exemplary embodiments of the invention. The artifacts according to FIG. 3 may relate to inductivity effects. Deviation features shown in FIG. 3 comprise overshoots 302, delays 304 and rounded edges 306. FIG. 4 additionally shows artifacts resulting from an amplifier, more specifically a gain decay of a pre-pumped amplifier. This may result in a non-horizontal envelope 400 having an impact on the intensity of the pulses 202. In other words, envelope 400 may render the intensity of the pulses 202 unequal.

Figure 5:
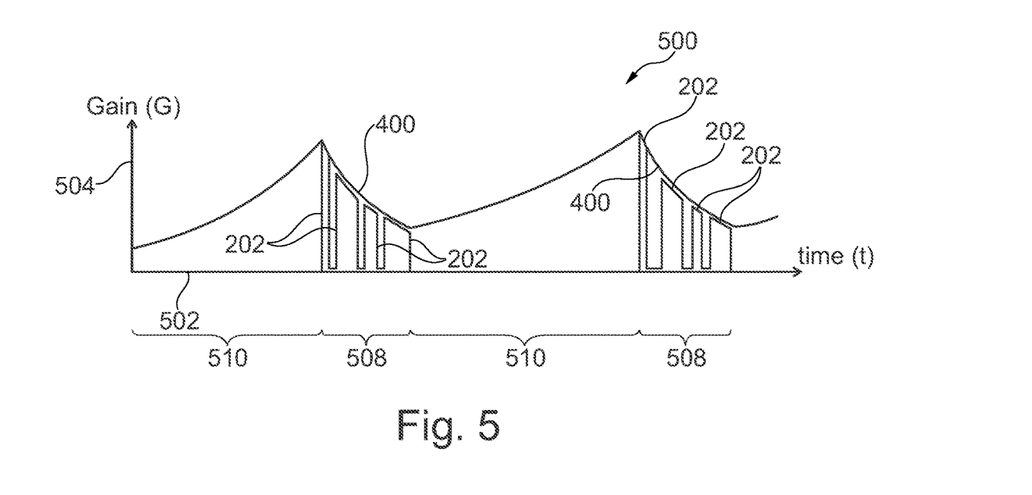
FIG. 5 shows amplifier loading and depletion and corresponding pulse shape artifacts which may be at least partially compensated according to an exemplary embodiment of the invention.

FIG. 5 shows a diagram 500 having an abscissa 502 along which the time is plotted. Along an ordinate 504, a gain is plotted. FIG. 5 shows pulse trains 508 of individual pulses 202. Intervals of re-pumping are denoted with reference numeral 510. For instance, one interval of re-pumping 510 may take several milliseconds, whereas one interval of a pulse train 508 may take several microseconds. An envelope 400 is shown. FIG. 5 therefore shows amplifier loading and depletion and also shows corresponding pulse shape artifacts which may be at least partially compensated according to an exemplary embodiment of the invention.

As an example, an amplifier depletion compensation model will be presented in the following. More specifically, an example of a fiber amplifier will be given which gets depleted during measurement.

A target may be to keep the output power $P_{out}$ of the amplifier constant over time t during a single pulse emission (input power $P_{in}$):

$$P_{out}(t) = G(t)P_{in}(t) = P_0 = \text{const}$$

G(t): momentary amplifier gain
$P_0$: target output power

An amplifier model may relate to an optical load. Thus, gain may reduce proportional with the emitted power. It may be assumed that re-pumping occurs on much longer time scale than a pulse length, thus re-pumping during emission is omitted or neglected.

β: decay constant of amplifier gain $$\dot{G}(t) = -\beta P_{out}(t) \rightarrow \dot{G}(t) = -\beta P_0 \Rightarrow G(t) = -\beta P_0 t + G_0$$

wherein $G_0$ is a gain offset value, corresponding to the initial gain at pulse train emission start.

These results, when combined, give:

$$\Leftrightarrow P_{in}(t) = \frac{P_0}{-\beta P_0 t + G_0}$$

For pulse trains, proper compensation can be achieved if the compensating function is not applied to the real time but to the integrated time $t_{comp}$ the input light was switched on.

$$t_{comp}(t) = \int_0^t c(t')dt'$$

$$c(t) = \begin{cases} 1 & \text{if light is on} \\ 0 & \text{if light is off} \end{cases}$$

$$\Leftrightarrow P_{in}(t) = \frac{P_0}{-\beta P_0 t_{comp}(t) + G_0}$$

Figure 6:
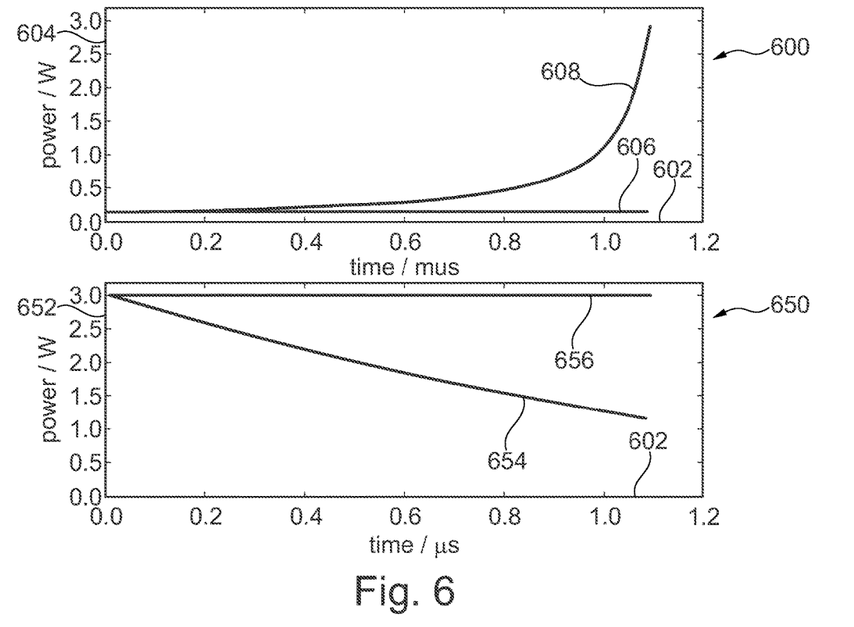
FIG. 6 shows diagrams illustrating, for the example of a single pulse, a dependence of input power and output power over time for a constant input and for a compensated input according to an exemplary embodiment of the invention.

As an example, a single pulse will be considered in the following (this consideration applies also to a sequence of pulses).

FIG. 6 shows diagrams 600, 650. In diagram 600, the time (in microseconds) is plotted along an abscissa 602, whereas input power $P_{in}$ is plotted along an ordinate 604. A first curve 606 relates to a constant input power $P_{in}$. A second curve 608 relates to an input power $P_{in}$ increasing over time. In diagram 650, the time (in microseconds) is plotted along abscissa 602, whereas output power Pout is plotted along an ordinate 652. A first curve 654 in diagram 650 relates to the constant input power $P_{in}$ according to the first curve 606 in diagram 600. A second curve 656 in diagram 650 relates to the input power Pin increasing over time according to the second curve 608 in diagram 600.

FIG. 6 hence illustrates, for the example of a single pulse, a dependence of input power $P_{in}$ and output power $P_{out}$ over time for a constant input (see curves 606, 654) and for a compensated input (see curves 608, 656) according to an exemplary embodiment of the invention. As can be taken from FIG. 6, a constant input may show exponential decay at the output (see curves 606, 654). The compensated envelope may show constant output (see curves 608, 656).

Figure 7:
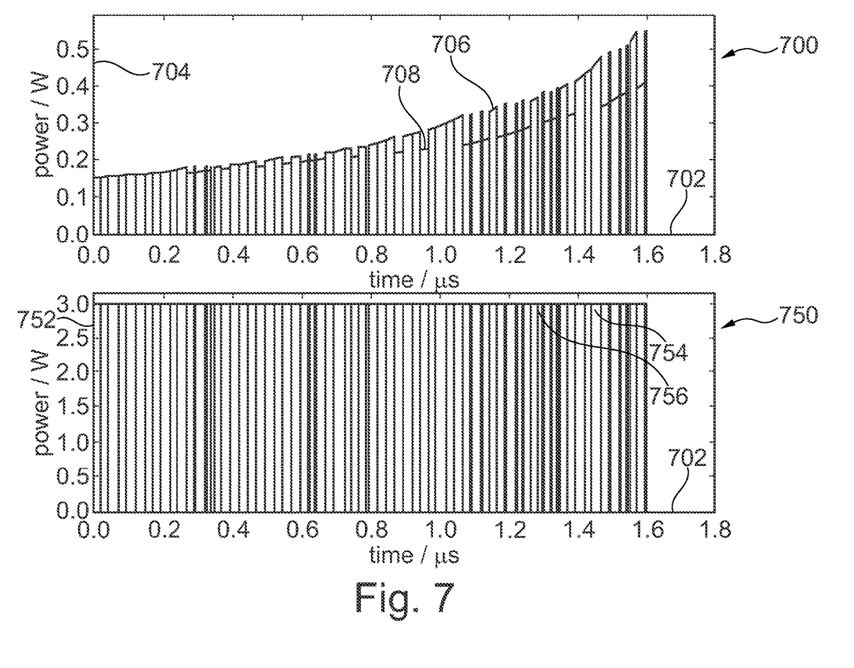
FIG. 7 shows diagrams illustrating, for the example of a pulse train, a dependence of input power and output power over time for different kinds of compensation according to an exemplary embodiment of the invention.

As another example, a pulse train will be considered in the following.

FIG. 7 shows diagrams 700, 750. In diagram 700, the time (in microseconds) is plotted along an abscissa 702, whereas input power $P_{in}$ is plotted along an ordinate 704. A first curve 706 relates to a full compensated code A scenario (wherein code A denotes a specific code type). A second curve 708 relates to a full compensated code NA scenario, wherein code NA denotes the logic inverse of code A (i.e. code NA assumes a logical value "1" when code A assumes a logical value "0", and vice versa). In diagram 750, the time (in microseconds) is plotted along abscissa 702, whereas output power $P_{out}$ is plotted along an ordinate 752. A first curve 754 in diagram 750 relates to the full compensated code A scenario according to the first curve 706 in diagram 700. A second curve 756 in diagram 750 relates to the full compensated code NA scenario according to the second curve 708 in diagram 700.

Hence, FIG. 7 shows diagrams 700, 750 illustrating, for the example of a pulse train, a dependence of input power and output power over time for different kinds of compensation according to exemplary embodiments of the invention.

It should be noted that the term "comprising" does not exclude other elements or features and the terms "a" or "an" do not exclude a plurality. Also elements described in association with different embodiments may be combined.

The invention claimed is:

1. A fiber measurement device for measuring a physical quantity by a fiber, the fiber measurement device comprising:
   an electromagnetic radiation source configured for generating at least one pulse of electromagnetic radiation as primary electromagnetic radiation to be coupled into the fiber;
   a determining unit configured for, prior to, during or after the generating, determining a deviation between a predefined target shape and an actual shape of the at least one pulse; and
   an adjustment unit configured for, prior to, during or after the generating, adjusting a shape of the at least one pulse for at least partially compensating the deviation between the predefined target shape and the actual shape of the at least one pulse.

2. The device according to claim 1, further comprising:
   an electromagnetic radiation detector configured for detecting secondary electromagnetic radiation generated in the fiber in response to the coupling of the primary electromagnetic radiation into the fiber.

3. The device according to claim 1, wherein the adjustment unit is configured for controlling the electromagnetic radiation source for generating the at least one pulse with an adjusted shape.

4. The device according to claim 3, wherein the adjustment unit is configured for adjusting a drive signal of the electromagnetic radiation source for generating the at least one pulse with the adjusted shape.

5. The device according to claim 1, wherein the adjustment unit is configured for adjusting the shape of the at least one pulse after generation of the at least one pulse by the electromagnetic radiation source.

6. The device according to claim 5, wherein the adjustment unit comprises an electromagnetic radiation manipulator configured for adjusting the shape of the at least one pulse by manipulating the primary electromagnetic radiation after its generation.

7. The device according to claim 6, wherein the electromagnetic radiation manipulator is configured for at least one of attenuating and amplifying the at least one pulse for adjusting its shape, in particular for at least one of attenuating and amplifying depending on an intensity profile of the at least one pulse.

8. The device according to claim 1, wherein the determining unit is configured for determining the deviation by an electromagnetic radiation sensor configured for sensing information indicative of the actual shape.

9. The device according to claim 8, further comprising:
   a beam splitter configured for splitting the primary electromagnetic radiation into a first portion to be coupled into the fiber and into a second portion to be coupled to the electromagnetic radiation sensor, wherein the second portion is smaller than the first portion.

10. The device according to claim 1, wherein the determining unit is configured for determining the deviation by analyzing actually detected secondary electromagnetic radiation concerning a predefined reference measurement feature obtained with the at least one pulse having the actual shape.

11. The device according to claim 1, wherein the determining unit is configured for determining the deviation based on a predefined model concerning an imperfection of the shape of the at least one pulse.

12. The device according to claim 1, wherein the adjustment unit is configured for adjusting the shape by averaging over multiple emissions of pulses or pulse trains.

13. The device according to claim 1, wherein the determining unit and the adjustment unit form part of a control loop in which the deviation is determined and the shape is adjusted.

14. The device according to claim 1, wherein the determining unit is configured for determining the deviation and/or the adjustment unit is configured for adjusting the shape before or during performing a fiber measurement.

15. The device according to claim 1, wherein the adjustment unit is configured for adjusting the shape of the at least one pulse upstream of the fiber.

16. The device according to claim 1, wherein the electromagnetic radiation source is configured for generating, as the at least one pulse, one of the group consisting of a single pulse, a sequence of pulses, a pulse train, or a modulation pattern.

17. The device according to claim 1,
   wherein the device is configured as one of the group consisting of a Distributed Temperature Sensing device, a Distributed Acoustic Sensing device, a Distributed Strain Sensing device, and an Optical Time-Domain Reflectometer device, and
   wherein in particular the measured physical quantity comprises at least one of the group consisting of temperature, sound, vibration, pressure, strain, torsion, electromagnetic fields, electromagnetic radiation, radioactive radiation, and chemical substances.

18. A method of measuring a physical quantity by a fiber, the method comprising:
   controlling an electromagnetic radiation source for generating at least one pulse of electromagnetic radiation as primary electromagnetic radiation to be coupled into the fiber;
   prior to, during or after the generating, determining a deviation between a target shape and an actual shape of the at least one pulse; and
   prior to, during or after the generating, adjusting a shape of the at least one pulse for at least partially compensating the deviation between the predefined target shape and the actual shape of the at least one pulse.

19. A non-transitory computer-readable medium, in which a computer program is stored, which computer program, when being executed by a processor, is adapted to control an electromagnetic radiation source for generating at least one pulse of electromagnetic radiation as primary electromagnetic radiation to be coupled into a fiber, prior to, during or after the generating, determining a deviation between a target shape and an actual shape of the at least one pulse and prior to, during or after the generating, to adjust a shape of the at least one pulse of electromagnetic radiation for at least partially compensating the deviation between the predefined target shape and the actual shape of the at least one pulse of electromagnetic radiation.

\* \* \* \* \*